United States Patent
Nishimura (10) Patent No.: US 7,065,671 B2
(45) Date of Patent: Jun. 20, 2006

(54) INFORMATION PROCESSOR, INFORMATION PROCESSING METHOD AND MEDIUM RECORDING INFORMATION PROCESSING METHOD

(75) Inventor: Hajime Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 10/169,600

(22) PCT Filed: Nov. 2, 2001

(86) PCT No.: PCT/JP01/09610

§ 371 (c)(1),
(2), (4) Date: Jul. 3, 2002

(87) PCT Pub. No.: WO02/37495

PCT Pub. Date: May 10, 2002

(65) Prior Publication Data

US 2003/0009708 A1    Jan. 9, 2003

(30) Foreign Application Priority Data

Nov. 6, 2000  (JP) .............................. 2000-342367

(51) Int. Cl.
*G06F 11/20* (2006.01)
*G06F 12/02* (2006.01)

(52) U.S. Cl. ........................ 714/8; 369/47.14; 711/112; 711/202

(58) Field of Classification Search ............. 369/53.16, 369/47.14, 53.15; 714/710, 5, 8; 711/202, 711/111, 112, 201
See application file for complete search history.

(56) References Cited

U.S. PATENT DOCUMENTS

| 4,558,446 | A | | 12/1985 | Banba et al. ................ 714/710 |
|---|---|---|---|---|
| 5,258,852 | A | | 11/1993 | Kamijima .................... 386/113 |
| 5,271,018 | A | * | 12/1993 | Chan .......................... 714/710 |
| 5,541,903 | A | * | 7/1996 | Funahashi et al. ........ 369/53.16 |
| 5,956,309 | A | * | 9/1999 | Yamamuro ............... 369/47.14 |
| 6,606,714 | B1 | * | 8/2003 | Thelin ........................... 714/8 |
| 6,697,307 | B1 | * | 2/2004 | Ko et al. ................. 369/47.14 |
| 6,901,041 | B1 | * | 5/2005 | Shin ........................ 369/53.15 |

FOREIGN PATENT DOCUMENTS

| EP | 0 383 298 | | 8/1990 |
|---|---|---|---|
| EP | 0 416 968 | | 3/1991 |
| JP | 07-114754 | | 5/1995 |
| JP | 07-307061 | | 11/1995 |
| JP | 09-035423 | * | 2/1997 |

OTHER PUBLICATIONS

Patent Abstracts of Japan, vol. 2000, No. 15, Apr. 6, 2001 & JP 2000 339874 A (Kenwood Corp), Dec. 8, 2000.

* cited by examiner

*Primary Examiner*—Gary Portka
(74) *Attorney, Agent, or Firm*—Frommer Lawrence & Haug LLP; William S. Frommer; Thomas F. Presson (57) ABSTRACT

As for a region in relation to a secondary defect, a recording means such as a memory or the like is separately used to carry out a recording and reproducing process. Thus, even when an exchange allocating process is carried out so as to ensure an access with a high reliability, data may be processed continuously.

19 Claims, 10 Drawing Sheets

| EIGHT BYTES | THREE BYTES | ONE BYTE | TEN BYTES | TWO BYTES | TWO BYTES | TWO BYTES | FOUR BYTES |
|---|---|---|---|---|---|---|---|
| NAME | EXTENSION | ATTRIBUTE | RESERVATION | RECORDED TIME | RECODED DATE | HEAD CLUSTER NUMBER | FILE LENGTH |

FIG. 6

| VALUE OF FAT (HEXADECIMAL NOTATION) | MEANING |
|---|---|
| 0000h | CORRESPODING CLUSTER IS "EMPTY" |
| 0002h TO FFF6h | CORRESPONDING CLUSTER IS "ALREADY ALLOCATED" VALUE CORRESPONDING IS CLUSTER NUMBER TO BE FOLLOWED |
| FFF7h | INDICATES "DEFECTIVE SECTOR" |
| FFF8h TO FFFFh | CORRESPONDING CLUSTER IS "ALREADY ALLOCATED" AND INDICATES FILE END (EOF) |

INFORMATION PROCESSOR, INFORMATION PROCESSING METHOD AND MEDIUM RECORDING INFORMATION PROCESSING METHOD

BACKGROUND OF THE INVENTION

1. Technical Field

The present invention may be applied to a case in which in an optical disc apparatus and a magnetic disc apparatus, for example, such as a hard disc apparatus for recording a video data and the like, an exchange allocating process is carried out to thereby reserve an access having a high reliability.

2. Background Art

Conventionally, as an apparatus for recording an audio data and a video data (hereafter, referred to as an AV data), a video tape recorder using a magnetic tape as a recording medium has been widely used. Such a video tape recorder is configured such that the AV data inputted in time series is divided by a field or frame unit of the video data, and obliquely recorded on the magnetic tape.

On the other hand, a personal computer is configured so as to use a hard disc apparatus and then record an application program and the like. Then, the hard disc apparatus has been sharply made denser and smaller.

In such a hard disc apparatus, it is connected to a personal computer through an interface, such as ATA (AT Attachment), SCSI (Small Computer System Interface) or the like, and used as a peripheral of the personal computer, and the data is managed at a sector unit, and an exchanging process of a defective region, an error correcting process, a retrying process and the like are carried out to thereby enable the data recorded on the hard disc to be reproduced at an extremely high accuracy.

With regard to the exchanging process of the defective region among them, the hard disc apparatus is configured so as to carry out two kinds of processes so that it copes with the defect of the hard disc. That is, in the defects induced in the hard disc, there are a primary defect and a secondary defect. Among them, the primary defect is the defect already induced at a time of manufacturing and shipping, and the secondary defect is induced because of aged deterioration.

The hard disc apparatus carries out a verifying process at the time of the manufacturing to detect the defective region caused by the primary defect at a sector unit and then register a physical address of this detected defective sector in a primary defect list. The hard disc apparatus, when a write command or a read command is inputted from a host computer, converts a logical address set for this command into the physical address to then access the hard disc. At this time, the hard disc apparatus converts the logical address into the physical address by referring to the primary defect list and thereby jumping over the defective sector and then carrying out the access (a so-called slipping process). Thus, the hard disc apparatus is configured so as to cope with the primary defect. This process is characterized in that since it is the process for jumping over the defective sector and carrying out only the access, the change in data transfer speed caused by the presence or absence of the defective sector is slight.

On the other hand, the hard disc apparatus copes with the secondary defect by carrying out an exchange allocating process. Here, the exchange allocating process is the process for allocating the defective sector to a sector of an change region that is a region for a spare set on an information recording surface. By the way, such a secondary defect is detected by carrying out a writing and verifying process at a time of writing, or a process at a time of reading out.

That is, the hard disc apparatus carries out this exchanging process, for example, in accordance with a read verify command (a command to carry out only an operation for verifying data without carrying out data transfer to a host) from a host apparatus. The hard disc apparatus, in this exchanging process, firstly detects an occurrence of an error in data portion and an ID portion at each sector. Actually, the hard disc apparatus establishes a standard for an ID detector in relation to a process for detecting those errors, an ECC error detecting process, a retrying process and the like. On the basis of this standard, it judges a reproduction result at the sector unit to thereby detect a sector that is poor in reliability. The hard disc apparatus, when detecting such a sector having the poor reliability, defines this sector as the defective sector caused by the secondary defect. The hard disc apparatus re-records the data recorded in the defective sector detected as mentioned above in a sector of an change region, and correlates the physical sector in this exchange region with the physical address of this defective sector, and then registers in a secondary defect list. The hard disc apparatus records this secondary defect list on the hard disc, and then completes the exchange allocating process.

The hard disc apparatus accesses the sector of the corresponding exchange region instead of the defective sector, in accordance with this secondary defect list if such an exchange allocating process is carried out, and thereby reserves the reliability. Thus, when the hard disc apparatus reproduces continuous sectors, if a part of the continuous sectors is the defective sector, it reproduces the continuous sectors immediately before the defective sector, and after that, it carries out a seeking operation and reproduces the corresponding sector of the exchange region (implying the exchange sector), and then seeks the sector subsequent to the original defective sector, and reproduces this subsequent sector. Hence, in the case of this exchange allocating process, it has a problem that a drop in the data transfer speed is remarkable, as compared with the case of the slipping process.

Figure 1:
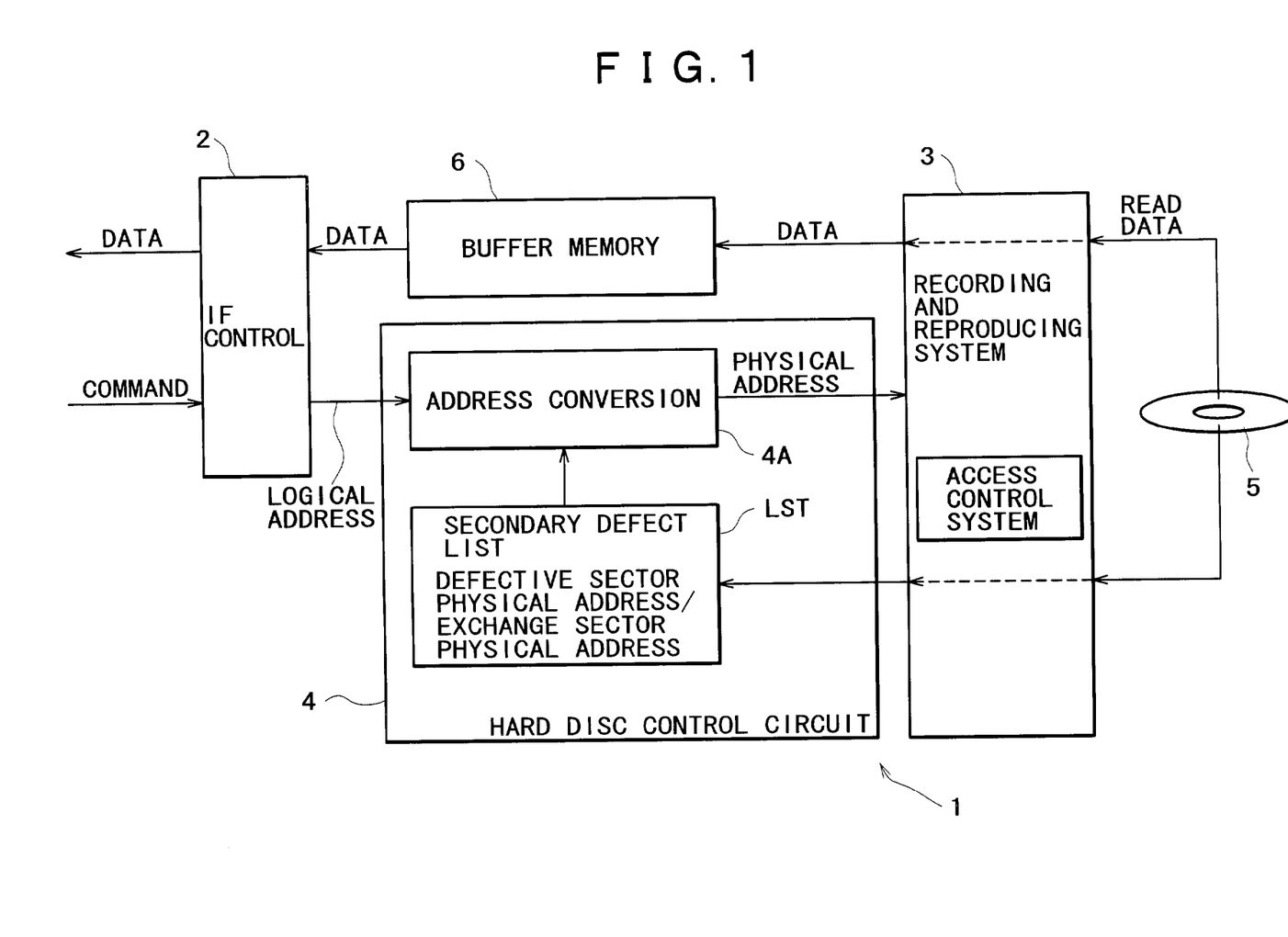
FIG. 1 is a block diagram showing a configuration corresponding to a read command of a conventional hard disc apparatus.

FIG. 1 is a block diagram showing the configuration of the hard disc apparatus, with regard to the reading out process when such an exchange allocating process is carried out. By the way, in the hard disc apparatus 1, an interface control circuit (IF control) 2 is a host interface, and it receives data used for writing and a command from a host apparatus, and outputs the data based on an access and a status corresponding to this command.

A recording/reproducing system 3 is provided with a read write data channel with regard to a signal process of a magnetic head and a servo system serving as a driving system. The recording/reproducing system 3 accesses a hard disc 5 in accordance with a physical address outputted by a hard disc control circuit 4, and drives the magnetic head in accordance with data outputted from a buffer memory 6, and then records this data on the hard disc 5. Further, at a time of reading out, it performs a signal process on an output signal of the magnetic head, and reproduces the data recorded on the hard disc 5, and then outputs to the buffer memory 6 or the hard disc control circuit 4. The recording/reproducing system 3 carries out this process, and reproduces a secondary defect list LST recorded on an inner circumference of the hard disc 5, when a power supply is turned on, and then reports to the hard disc control circuit 4.

The buffer memory 6 tentatively stores the output data of the recording/reproducing system 3, and carries out an error correcting process and the like, and then outputs through a host interface 2 to a host apparatus. By the way, at a time of recording, reversely to the above-mentioned case, the buffer memory 6 transiently stores the data outputted from the host apparatus through the host interface 2, and outputs to the recording/reproducing system 3.

The hard disc control circuit 4 analyzes the command inputted from the host interface 2, and controls the entire operation in the hard disc apparatus 1. In the process when the power supply is turned on, the hard disc control circuit 4 controls the recording/reproducing system 3, and instructs it to reproduce the secondary defect list LST, and then obtains the secondary defect list LST from the recording/reproducing system 3. The hard disc control circuit 4 stores this secondary defect list LST in a built-in memory.

In the condition that the secondary defect list LST is stored as mentioned above, the hard disc control circuit 4, when a read command is inputted through the host interface 2, converts a logical address added to this command into a physical address through a process in an address converter 4A, and instructs the recording/reproducing system 3 to carry out the reproduction based on this physical address. At this time, the hard disc control circuit 4 generates the physical address so as to access the corresponding exchange sector, for the defective sector, in accordance with the secondary defect list LST.

Figure 2:
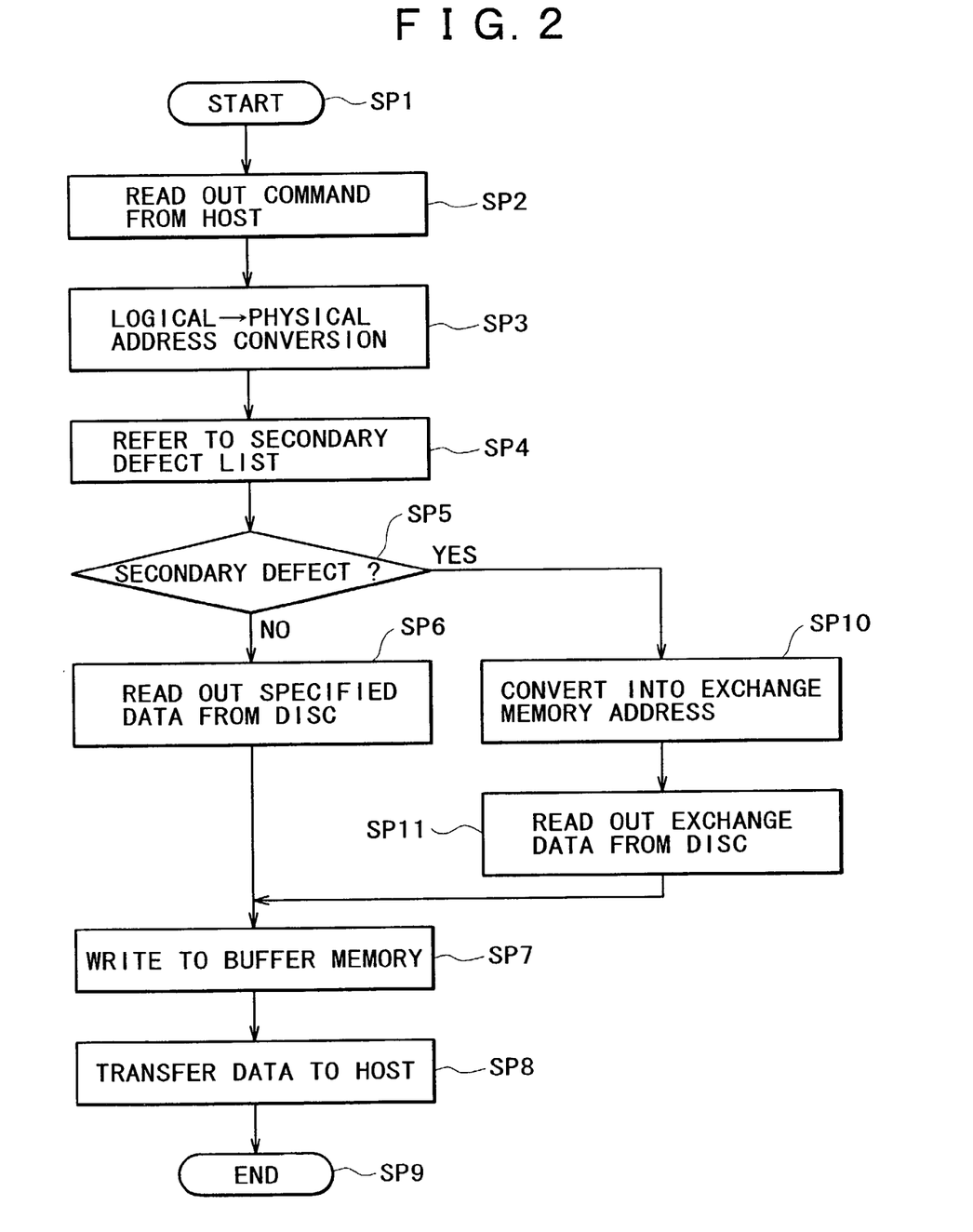
FIG. 2 is a flowchart showing a processing procedure of a read command of a hard disc control circuit in the hard disc apparatus in FIG. 1.

That is, FIG. 2 is a flowchart showing processing procedure of the hard disc control circuit 4 in relation to the read command. The hard disc control circuit 4, when the read command is inputted from the host apparatus, proceeds from step SP1 to step SP2. Then, it receives this read command, and converts a logical address based on a parameter set for this read command into a physical address of the hard disc 5, at a next step SP3.

In succession, at step SP4, the hard disc control circuit 4 refers to the secondary defect list LST stored in accordance with the physical address converted as mentioned above, and judges whether or not the sector based on the access includes the secondary defective sector, at a next step SP5. Here, if the sector based on the access does not include the secondary defective sector, the hard disc control circuit 4 proceeds to step SP6, and controls the entire operation in accordance with the thus-converted physical address, and then reads out the data instructed by the host apparatus from the hard disc 5, for the sector of this physical address.

Moreover, the hard disc control circuit 4 stores the data read out as mentioned above, in the buffer memory 6 at a next step SP7. The hard disc control circuit 4 outputs the data stored in the buffer memory 6 to the host apparatus at a next step SP8, and ends this processing procedure at step SP9.

On the other hand, if the sector based on the access includes the secondary defective sector, the hard disc control circuit 4 proceeds to the step SP5 to step SP10. Here, the hard disc control circuit 4 converts the physical address of the defective sector into the physical address of the exchange sector. Moreover, the hard disc control circuit 4 instructs it to access the hard disc 5 in accordance with the physical address including the physical address of the exchange sector as mentioned above, at a next step SP11.

Consequently, in the hard disc apparatus 1, if the access based on this read command includes the defective sector, the continuous sectors immediately before the defective sector are reproduced to then access the exchange sector at the defective sector and obtain a reproduction data, and after that, the sector subsequent to the defective sector is accessed to obtain the reproduction data. The hard disc control circuit 4, when reproducing the data from the hard disc 5 as mentioned above, proceeds to the step SP7, and records in a buffer memory 20, and then outputs to the host apparatus at the next step SP8, and ends this processing procedure.

Consequently, the hard disc apparatus is configured so as to seek the magnetic head before and after the defective sector, in accessing the continuous sectors, if such an exchange allocating process is carried out. Thus, in the hard disc apparatus, respective seeking times and rotation waiting times for a next sector are induced before and after this defective sector, which results in a case that it is difficult to reproduce the continuous data.

Incidentally, even in recording the AV data, it may be considered to apply the hard disc apparatus and thereby fabricate a small recorder that may attain the recording of a long time, instead of the video tape recorder. In this case, in the hard disc apparatus, it is required that the continuity of the data has priority over the reliability of the data.

However, in the hard disc apparatus, there may be a fear that it is difficult to reproduce the continuous data by the execution of the exchange allocating process because of the above-mentioned secondary defect. For this reason, if the conventional hard disc apparatus is merely applied to the recording/reproducing of the AV data, this application may lead to the fear of the occurrence of the fatal picture defect.

As one method of solving this problem, a method of carrying out the exchange allocating process at a plurality of sector units is further proposed (a so-called linear changing method). However, the case of this method requires a large number of exchange regions, which results in a problem that the information recording surface of the hard disc may not be effectively used corresponding to it, and as well as other similar problems.

DISCLOSURE OF THE INVENTION

The present invention is conceived in view of the above-mentioned problems. The present invention proposes an information processing apparatus, an information processing method and an information recording medium, in which data may be continuously processed even if an exchange allocating process is carried out while reserving an access of a high reliability.

To solve the above-mentioned problems, in the present invention, it is applied to an information processing apparatus, which is provided with: a defect judgment means for judging a physical address based on an access command by using a physical address of a region in relation to a secondary defect as a reference; and an exchanging processing means for carrying out the process according to the access command by using a predetermined recording means that is different from a disc type recording medium, for the region in relation to the secondary defect, in the physical address based on the access command, in accordance with a judged result by the defect judgment means.

In the physical address based on the access command, as for the region in relation to the secondary defect, this includes the exchanging processing means for carrying out the process based on the access command by using the predetermined recording means different from the disc type recording medium. Thus, for the region in relation to the secondary defect, without accessing the change regions separately set on the disc type recording medium, one by one, this predetermined recording means may be used to record or reproduce the data allocated to the region in relation to the secondary defect. Thus, even if the exchange allocating process is carried out, the data may be continuously processed.

Further, this is applied to an information processing method or a recording medium for recording the information processing method which is provided with: a step of a defect judgment for judging a physical address based on an access command by using a physical address of a region in relation to a secondary defect as a reference; and a step of an exchanging process for carrying out the process according to the access command by using a predetermined recording means that is different from a disc type recording medium, for the region in relation to the secondary defect, in the physical address based on the access command, in accordance with a judged result by the defect judgment step.

In the physical address based on the access command, as for the region in relation to the secondary defect, this includes the step of the exchanging process for carrying out the process based on the access command by using the predetermined recording means different from the disc type recording medium. Thus, for the region in relation to the secondary defect, without accessing the change regions separately set on the disc type recording medium, one by one, this predetermined recording means may be used to record or reproduce the data allocated to the region in relation to the secondary defect. Thus, even if the exchange allocating process is carried out, the data may be continuously processed.

BEST MODE OF EMBODYING THE INVENTION

Preferred embodiments of the present invention will be described below in detail with reference to the drawings.

(1) First Embodiment (1-1) Configuration of First Embodiment

Figure 3:
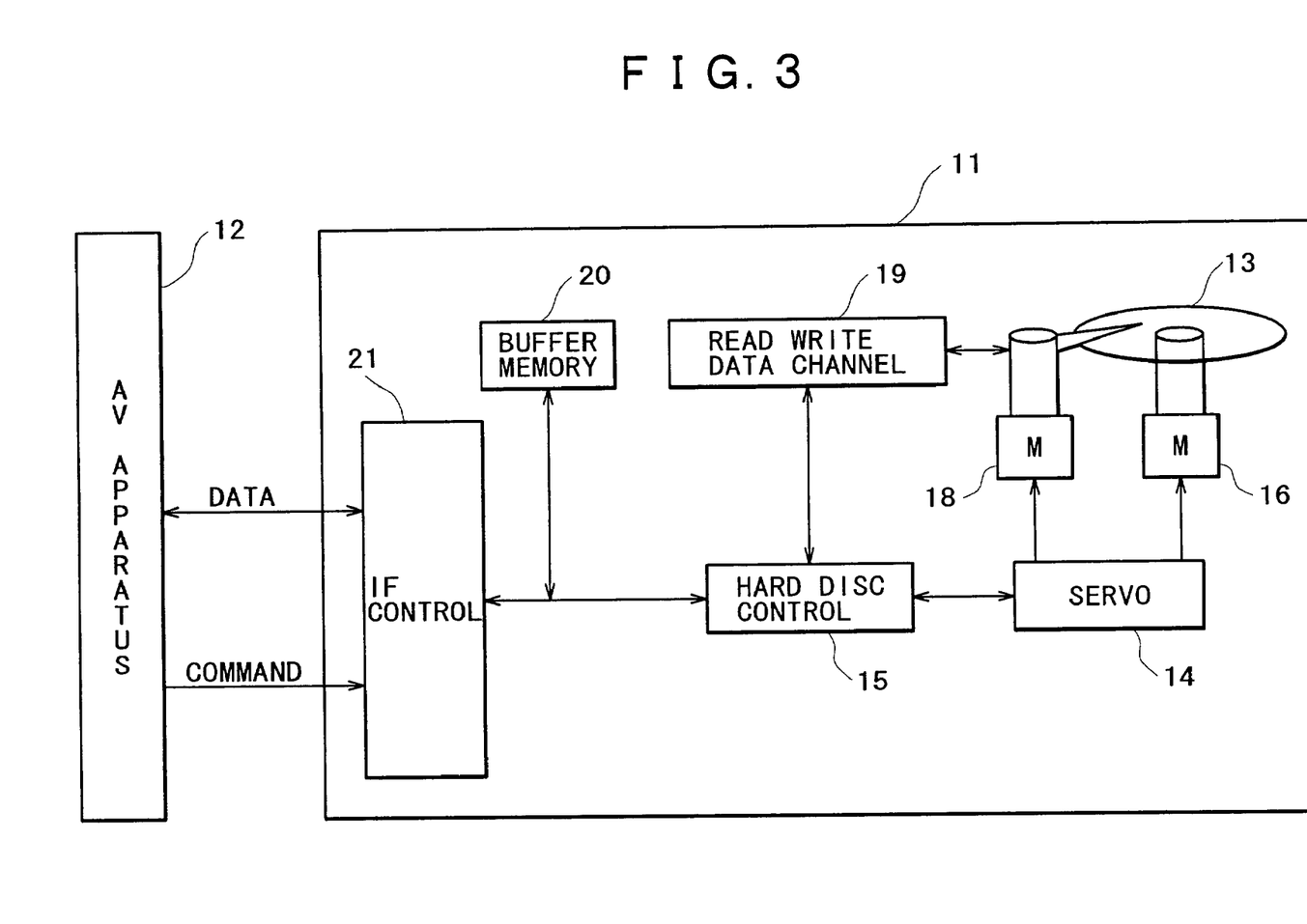
FIG. 3 is a block diagram showing a hard disc apparatus according to a first embodiment of the present invention.

FIG. 3 is a block diagram showing a hard disc apparatus according to the first embodiment of the present invention. The hard disc apparatus 11 is mounted in an image capturing apparatus, an AV apparatus 12 such as a Set-Top box or the like, a personal computer or the like, and it records various data outputted from those apparatuses. Further, when the hard disc apparatus 11 is mounted in those apparatuses or when it is removed from those apparatuses and mounted in another AV apparatus, another personal computer or the like, the recorded data is reproduced and outputted.

For this reason, the hard disc apparatus 11 is held in the AV apparatus or the like in attachable and detachable manners, and it outputs and receives text data or data in which AV data is compressed on the basis of a predetermined format or the like to and from those AV apparatuses 12, and outputs and receives a control command, a status data, an address or the like, in association with the reception/output of those data, to and from those apparatuses. Moreover, it records those data on a hard disc 13, and reproduces and outputs the data recorded on the hard disc 13.

Figure 4:
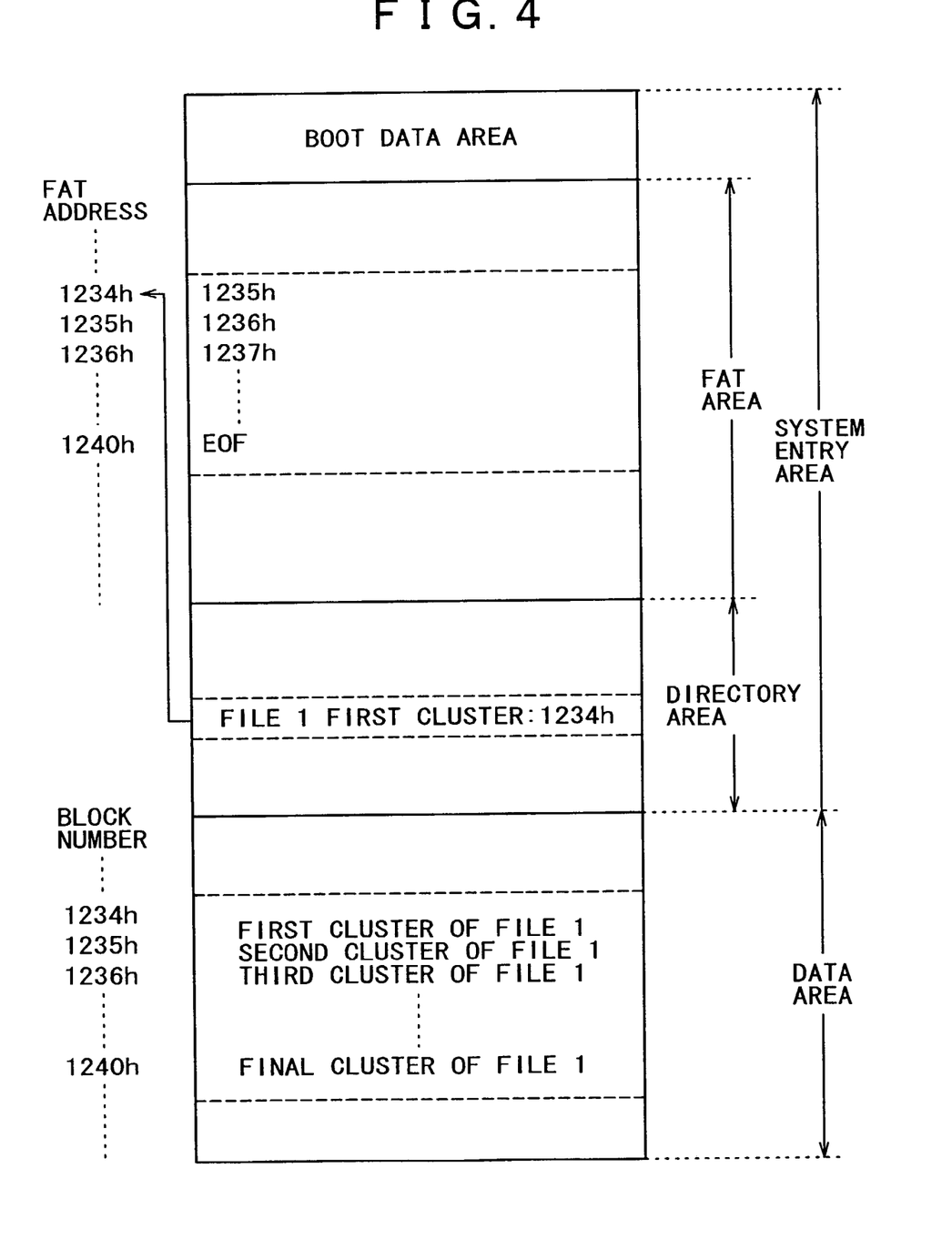
FIG. 4 is a table used to illustrate a recording region of a hard disc in the hard disc apparatus of FIG. 3.

Here, the hard disc 13 is formatted as shown in FIG. 4. That is, in the hard disc 13, the information recording surface is divided into an inner circumference region and an outer circumference region. The inner circumference region is allocated to a system entry area. Further, the outer circumference region is allocated to data area.

Among them, the data area is subdivided into clusters, and the data amount having the predetermined number of frames is used as a unit, and the AV data is recorded in each cluster. By the way, in the present embodiment, the hard disc 13 is configured such that the AV data corresponding to one GOP is allocated to one cluster, if the AV data is recorded as data-compressed on the basis of the format of MPEG (Moving Picture Experts Group).

Moreover, the hard disc 13 is configured such that the information recording surface is concentrically divided into a plurality of zones, and tracks in the respective zones are divided at a predetermined length in a circumferential direction, respectively, and divided into a plurality of sectors. In the hard disc 13 divided into the sectors as mentioned above, the physical addresses are defined on the basis of surface numbers of the information recording surface, track numbers continuously allocated from the outer circumference of the information recording surface, and sector numbers to specify the sectors in the respective tracks. Moreover, a user data is file-managed on the basis of the logical addresses defined in turn from the outer circumference of the information recording surface, corresponding to the physical address.

Here, the physical address is represented by a cluster number in which a cluster, which is constituted from a set of a plurality of logical sectors, is used as a unit. That is, the logical sector is the region corresponding to a recording unit of data in which a lead region of the information recording surface (the outermost circumference, in this case) is defined as a 0 sector. The present embodiment is configured such that one physical sector may represent a logical sector number in accordance with the following equation, corresponding to one logical sector. By the way, here, the surface number, the track number and the sector number are based on the physical address.

$$\begin{aligned} \text{Logical Sector Number} = \quad & \quad (1) \\ \text{Number of Sectors per One Track} \times & \\ (\text{Surface Number} + \text{Number of Surfaces} \times & \\ \text{Track Number}) + \text{Sector Number} - 1 & \end{aligned}$$

In this embodiment, the logical sector is configured such that data of 512 bytes may be recorded in one logical sector in terms of the user data, and one cluster is composed of a plurality of logical sectors. By the way, one cluster is typically composed of sectors as many as a power of 2, and specified on the basis of a cluster number that is a series of numerals with a lead of a file area as 2, in the data area in which the user data is recorded.

The data area is configured such that the cluster number is allocated to each cluster defined as mentioned above, and the access may be done at a cluster unit with this cluster number as a reference. By the way, in this embodiment, the cluster number is represented by a hexadecimal type of four digits.

On the other hand, the system entry area is further divided into a boot area, an FAT (Fail Allocation table) area and a directory area, and the data to define the structure of a disc is recorded in the boot area. On the other hand, the address information required to access the AV data recorded in the data area and the like are recorded in the FAT area and the directory area.

That is, a file name of each file recorded in the data area, a cluster number of a lead cluster implying a recording start position of each file and the like are recorded in the directory area. On the other hand, a cluster number of each cluster subsequent to the lead cluster of each file and the like are recorded in the FAT area. Thus, the hard disc 13, after detecting the lead cluster number of a desired file name from the directory area, may detect the cluster numbers subsequent to this lead cluster number in turn from the FAT area and thereby detect the addresses of the continuous clusters constituting one file.

Accordingly, in FIG. 4, if a file 1 is recorded in the clusters having cluster numbers 1234*h* to 1240*h* of the data area, a code indicative of the cluster number 1234*h* of a first cluster of the file 1 is recorded in the directory area, and the cluster numbers subsequent to this cluster number 1234*h* are further recorded in turn in the corresponding region of the FAT area. By the way, in FIG. 4, EOF (End Of File) is the identification information indicative of the final cluster in one file.

Figure 5:
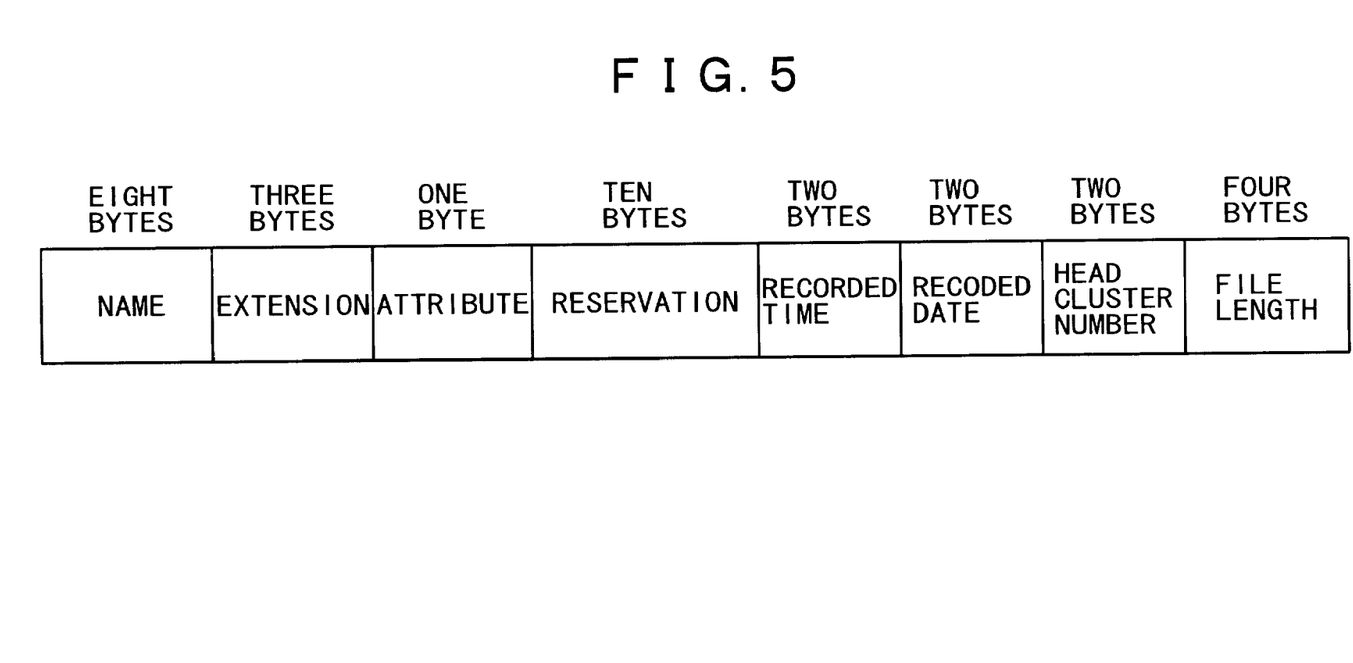
FIG. 5 is a table showing a file management data recorded in a directory area of FIG. 4.

Specifically, the file management data having the configuration shown in FIG. 5 is recorded in the directory area, for each file recorded in the data area. That is, in the file management data, the file name is allocated to 8 bytes from the top lead, and an extension identifier of each file is allocated to three bytes subsequent to them. Moreover, data indicative of an attribute of the file is allocated to one byte subsequent to them, and 10 bytes subsequent to it are allocated to data for reservation. Further, two bytes subsequent to them are allocated to data for a recording start time, two bytes subsequent to them are allocated to data for the date and hour, and the cluster number implying the lead cluster number is allocated to two bytes subsequent to them. By the way, data of a file length is allocated to the last four bytes.

Figure 6:
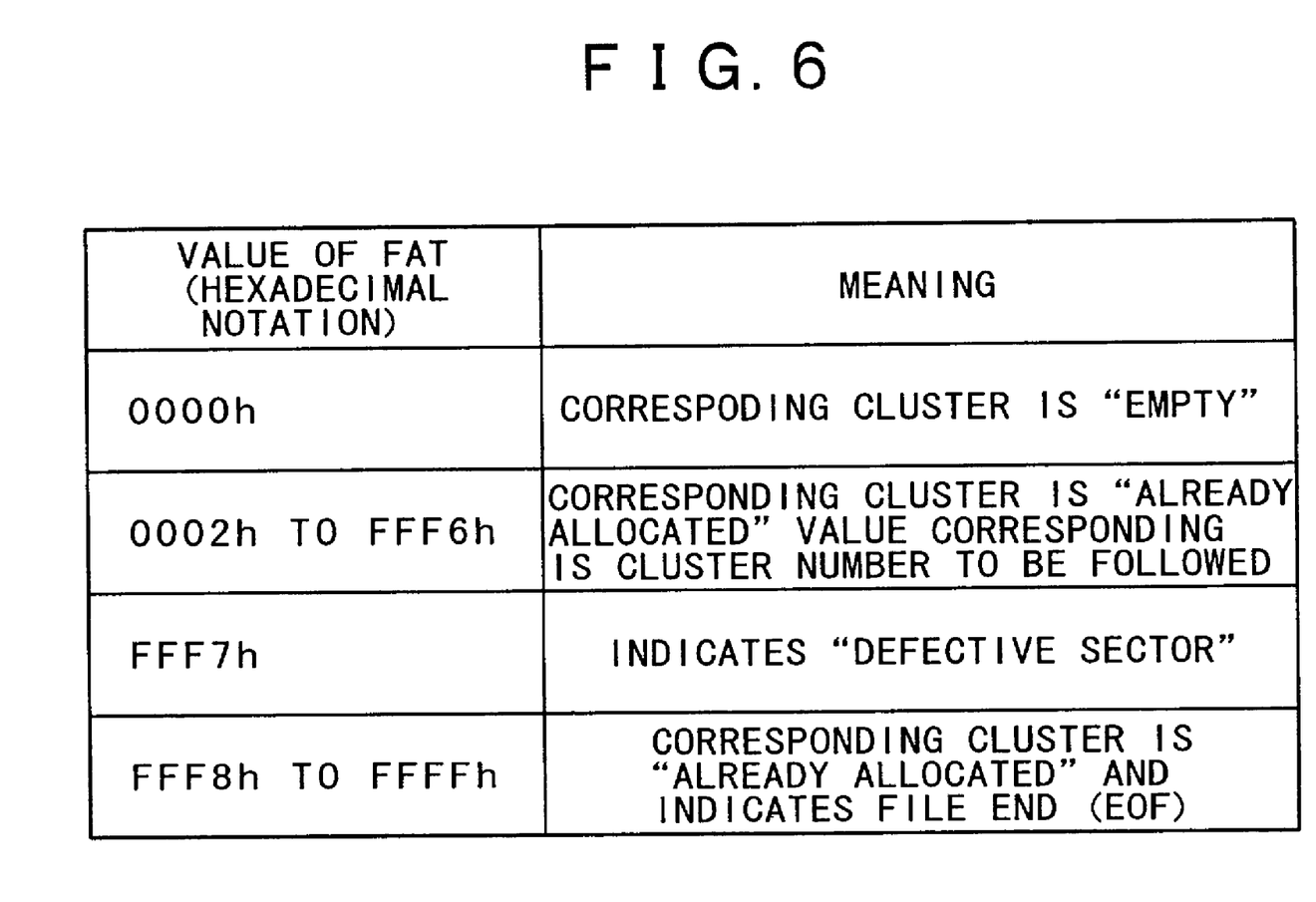
FIG. 6 is a table showing a code recorded in an FAT area of FIG. 4.

On the other hand, the FAT area (FIG. 4) is configured such that a cluster address is allocated corresponding to the cluster number of the data area, and the cluster number of the cluster subsequent to each cluster address is recorded. Further, as shown in FIG. 6, predetermined codes among the codes that are not allocated to those cluster numbers are allocated to the identification information respectively indicative of an empty region, a defective cluster and the EOF.

Thus, the hard disc 13 is configured so as to ensure the access to the FAT area and then the detection of the empty area in the data area. Further, it is configured so as to carry out the exchanging process with the defective sector as a reference and further register the defective sector by carrying out the retrying process through the writing and verifying operation at a time of the recording. Due to those processes, the hard disc 13 is configured so as to manage the information recording surface at a predetermined block unit, similarly to a file managing system applied to a personal computer.

The servo circuit 14 (FIG. 3) drives a motor (M) 16 in accordance with the control of a hard disc control circuit 15, and thereby rotation-drives the hard disc 13 at a predetermined rotational speed. Further, the servo circuit 14 similarly drives a motor (M) 18 to thereby seek the magnetic head, and further carries out a tracking control.

A read write data channel 19 performs an encoding process on an output data of the hard disc control circuit 15, by using a method suitable for property of the present recording/reproducing system, under the control of the hard disc control circuit 15, and generates the data in a bit series, and then drives the magnetic head in accordance with this data. Further, at a time of the reproducing, the read write data channel 19 performs a signal process on a reproduction signal obtained from the magnetic head, and generates a reproduction data, and then outputs this reproduction data to the hard disc control circuit 15.

The hard disc control circuit 15 is a control circuit for managing the data on the hard disc 13, and it controls the operation of the servo circuit 14 on the basis of the AV data inputted from the buffer memory 20, and outputs this AV data to the read write data channel 19, and thereby records those AV data on the hard disc 13. Further, at the time of the reproducing, it similarly controls the operation of the servo circuit 14, and outputs an output data of the read write data channel 19 to the buffer memory 20, and then reproduces the data requested by a host apparatus.

In those controls, when receiving a read verifying command from the host apparatus through the interface control circuit 21, the hard disc control circuit 15 controls the entire operation so as to carry out the exchange allocating process, similarly to the case in the hard disc apparatus based on the above-mentioned conventional configuration shown in FIG. 1. That is, the hard disc control circuit 15 sequentially accesses the hard disc 13, and detects the defective sector, and re-records the data of this detected defective sector in the sector of the change region, and then records a secondary defect list on the hard disc 13. Further, for the reading writing command, which will be described later, it uses the thus-recorded secondary defect list as a reference, and accesses the hard disc 13.

The interface control circuit (IF control) 21 is configured from, for example, an SCSI controller, an IDE controller, an ATA controller and the like, and constitutes an input/output circuit for sending and receiving the data, the control command, the address and the like to and from those AV apparatuses 12. For the AV data among them, the interface control circuit (IF control) 21 outputs to the hard disc control circuit 15 the AV data received from the AV apparatus 12 through the buffer memory 20, at the time of the recording. Further, at the time of replay, it outputs to the AV apparatus 12 the AV data outputted from the hard disc control circuit 15, through the buffer memory 20.

Figure 7:
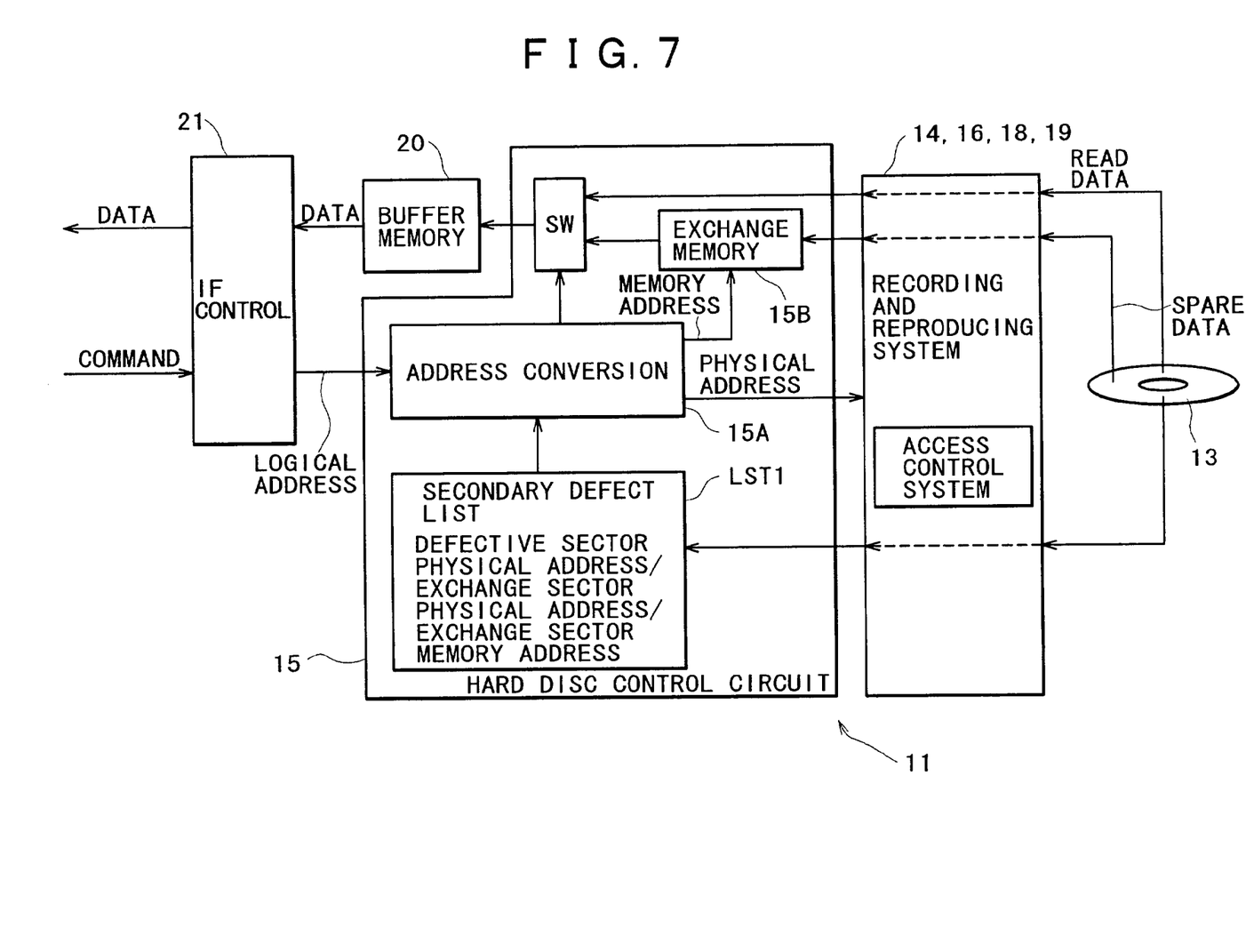
FIG. 7 is a block diagram showing the configuration corresponding to the read command of the hard disc apparatus of FIG. 1.

FIG. 7 is a block diagram showing configuration of the hard disc apparatus 11, with regard to the reading out process when the exchange allocating process is carried out. In the hard disc apparatus 11, the hard disc control circuit 15 treats the data in relation to the defective sector recorded in the exchange sector by using an exchange memory 15B that serves as a recording means different from the hard disc 13, and thereby assuring the continuous processing of data. Here, the exchange memory 15B is comprised of a volatile memory (DRAM) built in the hard disc control circuit 15.

Figure 8:
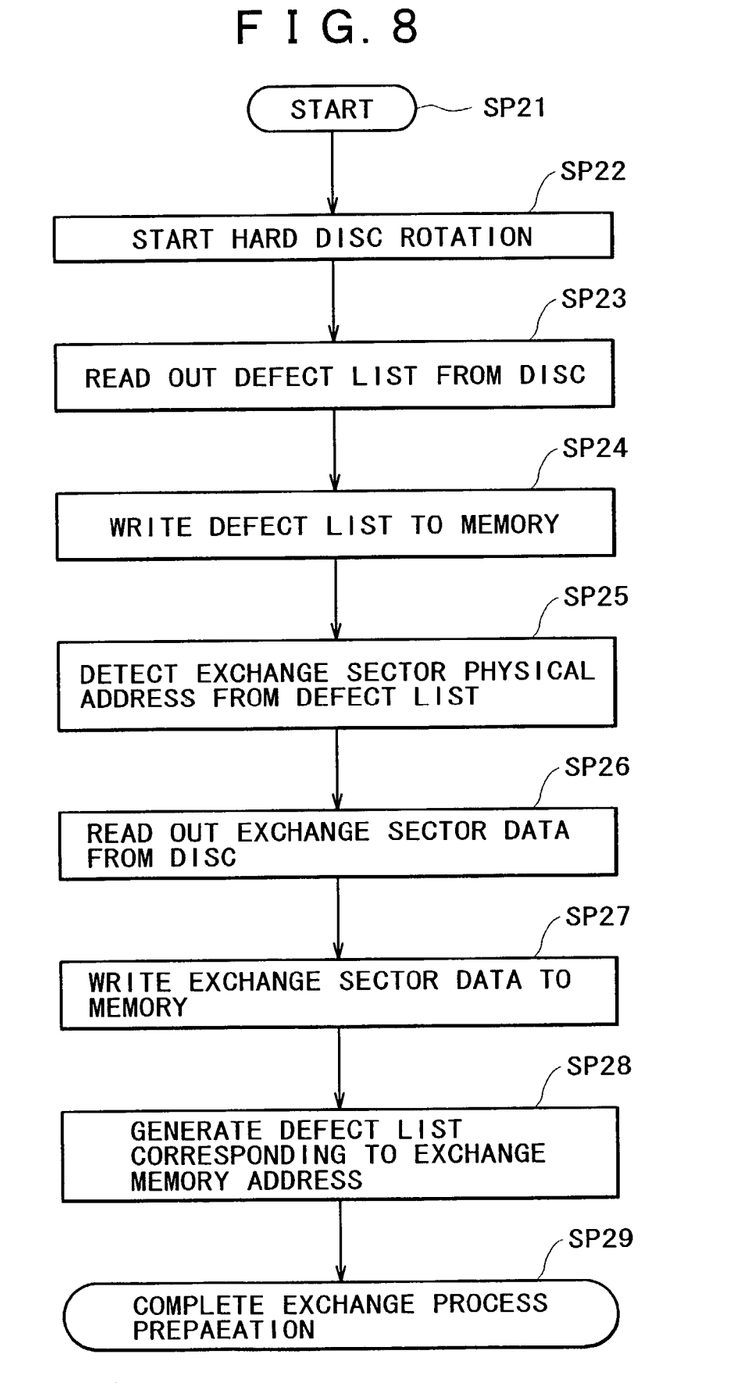
FIG. 8 is a flowchart showing a processing procedure when the hard disc control circuit in the hard disc apparatus of FIG. 7 is actuated.

For this reason, the hard disc control circuit 15, when the power is turned on, carries out processing procedure shown in FIG. 8, and stores data that is previously recorded in the exchange sector of the hard disc 13 in the exchange memory 15B in advance. Further, it obtains the secondary defect list recorded on the hard disc 13, and correlates a physical address of the defective sector defined in this secondary defect list with a memory address of the exchange memory 15B, in which the corresponding data is recorded, and then stores it in the built-in memory.

That is, when the power is turned on, the hard disc control circuit 15 proceeds from step SP21 to step SP22, and controls the operation of the servo circuit 14, and then starts the rotation of the hard disc 13. In succession, the hard disc 5 proceeds to step SP23. Here, it controls the operations of the read write data channel 19 and the servo circuit 14, and obtains the secondary defect list from the hard disc 13, and then records it in the built-in memory.

Moreover, the hard disc control circuit 15 detects the physical address of the exchange sector from the record of this secondary defect list, at a next step SP25, and instructs to access the hard disc 13 in accordance with this detected physical address at a next step SP26, and then reproduces the record of the exchange sector. The hard disc control circuit 15 records this reproduced data in the exchange memory 15B at a next step SP27.

The hard disc control circuit 15 then records the memory address of the exchange memory 15B, which is recorded as mentioned above, in the secondary defect list stored in the memory while correlating it with the physical address of the defective sector, and proceeds to step SP29, and then ends this processing procedure. Thus, the hard disc control circuit 15 carries out the process in advance, and thereby reproduces the record of the exchange allocating process from the hard disc 13, and then records the physical address of at least the defective sector, and further obtains the defect list.

The hard disc control circuit 15 judges the physical address based on the access command, in accordance with the thus-obtained defect list, and uses the exchange memory 15B instead of the hard disc 13, for the region in relation to the secondary defect, in the physical address based on the access command, and then carries out the process in relation to the access command, and enables to effectively avoid the unnecessary time consumed by the seek processing, and thereby assuring the continuous process of data.

Figure 9:
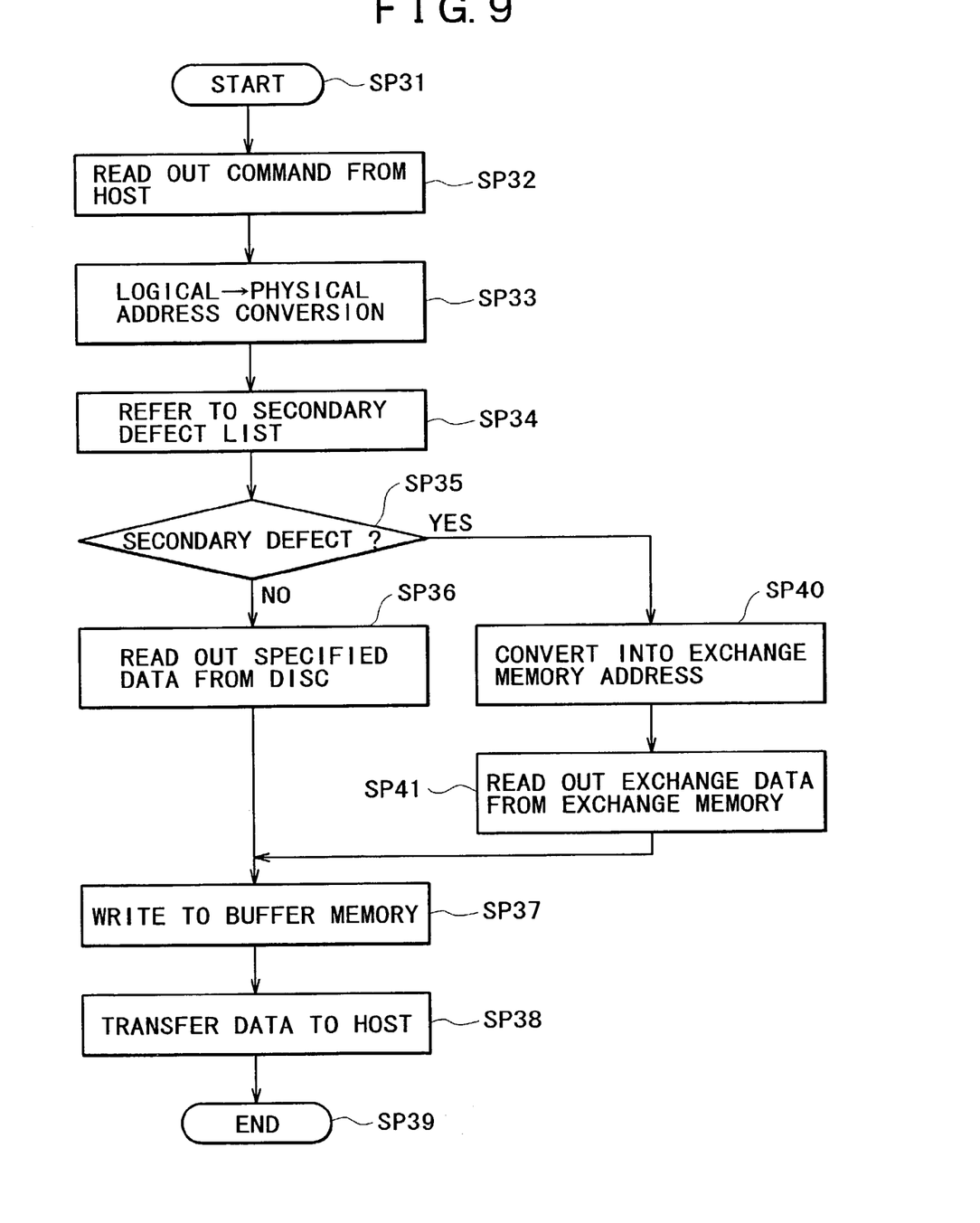
FIG. 9 is a flowchart showing processing procedure of the read command of the hard disc control circuit in the hard disc apparatus of FIG. 7.

That is, FIG. 9 is a flowchart showing processing procedure of the hard disc control circuit 15 when the read command is inputted from the host apparatus 12. The hard disc control circuit 15, when the read command is inputted from the host apparatus, proceeds from step SP31 to step SP32, and receives this read command, and then converts the logical address based on the parameter set for this read command into the physical address of the hard disc 13, at a next step SP33.

In succession, the hard disc control circuit 15 refers to a secondary defect list LST1 stored in accordance with the thus-converted physical address at step SP34, and judges whether or not the sector in relation to the instant access includes the secondary defective sector at a next step SP35. Here, if the sector in relation to the instant access does not include the secondary defective sector, the hard disc control circuit 15 proceeds to step SP36, and controls the entire operation in accordance with the thus-converted physical address, and then reads out the data requested by the host apparatus 12 from the hard disc 13, for the sector of this physical address.

Further, the hard disc control circuit 15 stores in the buffer memory 20 the data read out as mentioned above, at a next step SP37. The hard disc control circuit 15 outputs to the host apparatus 12 the data stored in the buffer memory 20, at a next step SP38, and completes this processing procedure at step SP39.

On the other hand, if the sector in relation to the instant access includes the secondary defective sector, the hard disc control circuit 15 proceeds from step SP35 to step SP40. Here, the hard disc control circuit 15 refers to the secondary defect list LST1 stored in the memory, and converts the physical address of the defective sector into the memory address of the exchange memory 15B. Further, the hard disc control circuit 15 accesses the exchange memory 15B in accordance with the thus-detected memory address, at the next step SP41, and instructs to access the hard disc 13 in accordance with the physical addresses including the physical address of the defective sector.

Accordingly, in the hard disc apparatus 11, if the instant access based on this read command includes the defective sector, after the continuous sectors immediately before the defective sector are reproduced, the data in the previously obtained exchange memory 15B is outputted for the defective sector. After that, the sector subsequent to the defective sector is accessed to then obtain the reproduction data. Thus, the hard disc control circuit 15 is configured so as to ensure the continuous data to be outputted without any interruption.

On the other hand, if the write command is inputted from the host apparatus 12, the hard disc control circuit 15 similarly generates the physical address of the hard disc 13 in accordance with the parameter set for the command. Moreover, it judges whether or not based on this physical address, the defective sector is included in the access target. The hard disc control circuit 15 judges the physical sector of the access target as mentioned above, and instructs to write to the hard disc 13, similarly to the usual hard disc apparatus, except the defective sector.

On the other hand, as for the defective sector, instead of the recording to the exchange sector of the hard disc 13, the writing to the exchange memory 15B is instructed, and the memory address of the exchange memory 15B written as mentioned above is further correlated with the physical address of the corresponding defective sector and recorded in the secondary defect list LST1. Thus, the hard disc apparatus 11 is configured so as to ensure continuous recording of data without any interruption even at time of the recording processing.

The hard disc control circuit 15, if the secondary defect list LST1 is updated as mentioned above, records the data that corresponds to the defective sector in the exchange memory 15B of the corresponding exchange sector, using latency of the command and during a series of processes performed when the power is turned off. Thus, the hard disc control circuit 15 is configured so as to ensure accessing to the hard disc 13 by carrying out the above-mentioned series of processes, even in a case of an access after the power has turned on.

From those explanations, the hard disc control circuit 15 is configured so as to constitute the exchange allocating processing means for detecting the region in relation to the secondary defect from the information recording surface of the hard disc 13 and then setting the exchange region used in the recording/reproducing process instead of such a region, together with the recording/reproducing system. Further, the hard disc control circuit 15 is configured so as to constitute the defect judgment means for judging the physical address based on the access command by using the physical address of the region in relation to this secondary defect as the reference, and further constitute the exchanging processing means for carrying out the process for the access command by using the exchange memory 15B serving as the predetermined recording means different from the disc type recording medium, for the region in relation to the secondary defect, in the physical address based on the access command, in accordance with this judged result.

(2) Operation of First Embodiment

In the above-mentioned configuration, the hard disc apparatus 11 (FIG. 3) is mounted in the imaging apparatus and the AV apparatus 12, for example, such as the set top box and the like. When the power is turned on, the data recorded in the system entry area of the hard disc 13 is loaded into the memory.

In the hard disc apparatus 11, when the write command is inputted from those AV apparatuses 12, the AV data inputted after this command is inputted to the read write data channel 19 through the hard disc control circuit 15. Here, the AV data is modulated in accordance with the format suitable for the recording. Then, the magnetic head is driven to sequentially record the AV data into the empty region of the hard disc 13. At this time, in the hard disc apparatus 11, on the basis of the data in the system entry area loaded into the memory, the empty regions in the hard disc 13 are sequentially detected (FIG. 4 and FIG. 6), and the AV data is sequentially recorded in those detected empty regions. Further, the data in the system entry area stored in the memory is updated so as to correspond to this recording process (FIG. 5), and the system entry area in the hard disc 13 is updated so as to correspond to the content in the memory.

In contrast with the above, when the read command is inputted, the reproduction signal obtained through the magnetic head is processed by the read write data channel 19, and the AV data is reproduced. Then, the AV data is outputted through the hard disc control circuit 15 and the interface control circuit 21 to the AV apparatus 12. At this time, in the hard disc apparatus 11, the cluster numbers in which the AV data are recorded are retrieved in turn by retrieving the data in the system entry area stored in the memory, and the physical addresses of the sectors in relation to these cluster numbers are detected in turn, and the hard disc 13 is sequentially accessed in accordance with those physical addresses. Accordingly, the file requested by the AV apparatus 12 is reproduced.

In the above cited processes, in the hard disc apparatus 11, the reading and verifying process are carried out to thereby detect a sector, in which an error rate in each of a sector ID portion and a data portion, is deteriorated to a certain standard or less, and a sector in which the number of the re-try repetitions is equal to or greater than a predetermined number of times. Accordingly, the defective sector caused by the secondary defect is detected. In this case, in the hard disc apparatus 11, the exchange allocating process is carried out to thereby re-record the data of such a defective sector in the sector of the change region and further record those relations on the inner circumference of the hard disc 13. Accordingly, in the hard disc apparatus 11, the reliability of data may be ensured by preventing use of the sector whose reliability is deteriorated for future recording and reproducing operations.

In the hard disc apparatus 11 for carrying out the exchange allocating process as in the typical hard disc apparatus through the same process as mentioned above, the process at time of the start-up (FIG. 6 and FIG. 8) is carried out to thereby read out the record during the exchanging process recorded in hard disc 13 as mentioned above, and from the relation between the exchange sector and the defective sector based on this record, the data recorded in the exchange sector is recorded in the exchange memory 15B that is built in the hard disc control circuit 15. Further, the relation between the memory address of this exchange memory 15B and the defective sector is listed and then recorded in the memory of the hard disc control circuit 15.

In the hard disc apparatus 11, by recording the data of the exchange sector in the exchange memory 15B as mentioned above, it is possible to process the access with regard to the defective sector utilizing this exchange memory 15B instead of the exchange sector, and thereby enabling the continuous data processing without any interruption.

That is, in the hard disc apparatus 11, when the physical address of the hard disc 13 is detected on the basis of the parameter set for the command, it is judged whether or not the sector based on this physical address is the defective sector. In the case of the defective sector, the writing process and the reading out process are performed on the exchange memory 15B instead of the exchange sector. That is, at the time of reading out processing, the data of the defective sector is outputted in accordance with the access to the exchange memory 15B instead of the access to the exchange sector. Further, at the time of writing processing, the data of the defective sector is recorded in the exchange memory 15B instead of the recording to the exchange sector. After that, the data of the exchange memory 15B is re-recorded in the exchange sector.

Accordingly, in the hard disc apparatus 11, even if the exchange allocating process is carried out to thereby ensuring the access with the high reliability, the data may be processed continuously.

(1-3) Effect of First Embodiment

According to the above-mentioned configuration, as for the region in relation to the secondary defect, the recording means such as the memory or the like is separately used to carry out the recording and reproducing process. Thus, even if the exchange allocating process is carried out to thereby ensuring the access with the high reliability, the data may be processed continuously.

At this time, the data already recorded in the region in relation to the secondary defect is re-recorded in the exchange region set for the hard disc 13 by carrying out the exchange allocating process, and the data already recorded in this exchange region is re-recorded in the exchange memory 15B by carrying out the process at the time of start-up that is the process performed in advance. Thus, as for the exchange allocating process, it may be carried out through the processing procedure in the conventional hard disc apparatus. Accordingly, an overall configuration may be simplified, and the data may be read out and outputted continuously without any interruption.

Further, by carrying out such a process in advance for re-recording in the exchange memory 15B at the time of start-up, the data recorded in the system entry area may be processed together with another process to be performed at the time of start-up, such as the process for loading into the hard disc control circuit 15 or the like. Accordingly, it becomes possible to instantly start the access to the hard disc.

(2) Second Embodiment

In this embodiment, the region used in the exchange allocating process is set on a recording means different from the hard disc 13. Here, as shown in FIG. 10 in comparison with FIG. 7, a hard disc apparatus 31 in accordance with this embodiment is equally configured to the hard disc apparatus 11 according to the first embodiment except that the configuration of a hard disc control circuit 35 is different.

That is, in the hard disc apparatus 31, the hard disc control circuit 35 detects in turn the secondary defective sectors in accordance with the read verify command, similarly to the hard disc control circuit 15, and carries out the exchange allocating process, and then re-records the data of the defective sector in the exchange memory 15B composed of non-volatile memories, instead of the change region on the hard disc 13, in this exchange allocating process. Further, the physical address of the defective sector re-recorded as mentioned above and the memory address of the exchange memory 15B are listed to then records as the secondary defect list on the hard disc 13.

Further, when the power is turned on, a secondary defect list LST2 recorded on the hard disc 13 as mentioned above is loaded and stored. The hard disc control circuit 35 detects in turn the physical addresses of the sectors in relation to the accesses in accordance with an access command from the host apparatus 12, and carries out the accessing process through the exchange memory 35B if this physical address is the address in relation to the defective sector. That is, if the access command is the read command, instead of the defective sector, it outputs the corresponding data recorded in this exchange memory 35B to the host apparatus. On the other hand, in a case of the write command, it records the data in the exchange memory 35B, instead of the defective sector.

Figure 10:
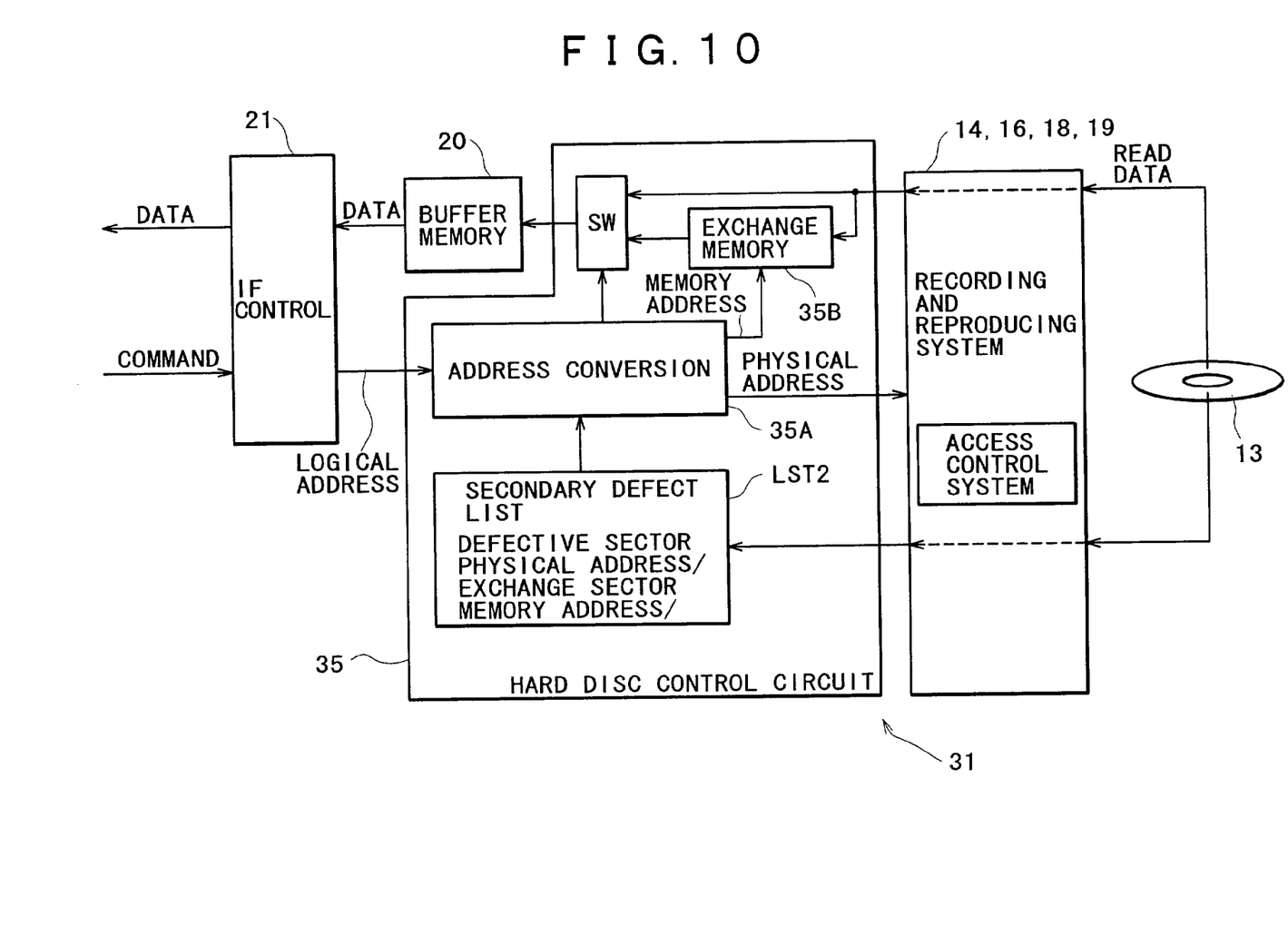
FIG. 10 is a block diagram showing a configuration corresponding to a read command of a hard disc apparatus according to a second embodiment of the present invention.

According to the configuration of FIG. 10, the exchange memory serving as the predetermined recording means different from the hard disc is used to carry out the process for the access command, and the data already recorded in the region in relation to the secondary defect is directly re-recorded in this exchange memory to thereby enable the reduction in the time necessary for the exchange allocating process. Further, at the time of the power turn-on, the process for re-recording of each record of the exchange sectors in the change sectors one by one may be omitted thereby enabling reduction of the start-up time at time of the power turn-on. Further, the information recording surface on the hard disc may be effectively utilized because of the omission of the exchange region on the hard disc.

(3) Third Embodiment

In this embodiment, the secondary defect list at each file unit is recorded on the hard disc under the configuration according to the first embodiment. Further, instead of the transfer of the data to the exchange memory from the exchange sector when the power is turned on, if the file is specified by the read command, the data is transferred to the exchange memory from the exchange sector for this file, and the access to this file is then started.

As for loading of the secondary defect list from the hard disc 13, the loading is performed when the file is specified by the read command instead of the time that the power is turned on, and the secondary defect list is loaded only for the portion of the corresponding file.

Accordingly, this embodiment is configured so as to ensure effect similar to the first embodiment even if the exchange memory is configured at a smaller memory capacity. Further, it is configured such that the processes at the power turned-on may be reduced thereby making the start-up time shorter.

(4) Fourth Embodiment

In this embodiment, the access command is selectively processed by using the exchange memory depending on a type of file, under the configuration according to the first or second embodiment. That is, as described above, it is characterized in that although the process of the continuous data is preferentially processed for the AV data, importance is not given to the above-mentioned data continuity in another text data or the like. Thus, in this embodiment, the hard disc control circuit judges the type of file, on the basis of an extension identifier of the file, and selectively carries out the accessing process by using the exchange memory, only for the file including video data.

If the process is selectively switched depending on the type of file as mentioned above, the effect similar to the first or second embodiment may be correspondingly obtained by effective use of the exchange memory.

(5) Other Embodiments

Further, in the above-mentioned embodiments, the case is described in which the exchange memory is composed of the memories built in the hard disc control circuit. However, the present invention is not limited to this case. The partial region of the buffer memory or the like may be used to configure the exchange memory, and various recording means different from the hard disc may be widely applied.

In the above-mentioned embodiments, the case is described in which the secondary defect list is recorded on the hard disc. However, the present invention is not limited to this case. It may be recorded in another recording means.

Further, in the above-mentioned embodiments, the case is described in which the secondary defect is processed at the sector unit. However, the present invention is not limited to this case. For example, the present invention may be widely applied to the case in which it is processed at the cluster unit.

Further, in the above-mentioned embodiments, the case is described in which the present invention is applied to the information processor serving as the hard disc apparatus. However, the present invention is not limited to this case. It may be widely applied to the information processor, which is connected to a desired apparatus, such as an optical disc apparatus or the like, or built in the desired apparatus, for recording and reproducing the data of those apparatuses.

As mentioned above, according to the present invention, as for the region in relation to the secondary defect, the recording means such as the memory or the like is separately used to carry out the recording and reproducing process. Thus, even if the exchange allocating process is carried out so as to ensure the access with the high reliability, the data may be processed continuously.

INDUSTRIAL AVAILABILITY

With regard to the information processing apparatus, the information processing method and the recording medium for recording the information processing method, for example, they may be applied to the magnetic disc apparatus and the optical disc apparatus such as the hard disc apparatus for recording the video data and the like.

The invention claimed is:

1. An information processing apparatus for converting a parameter of an access command into a physical address of an information recording surface of a recording medium, and accessing said recording medium in accordance with the physical address, said information processing apparatus comprising:
   an exchange allocating processing means for detecting a region in relation to a secondary defect from said information recording surface, and setting one exchange region to be used for a recording and reproducing process so as to replace said region in relation to said secondary defect;
      wherein a secondary defect list is detected by a read-write data channel and a servo circuit in accordance with an access command for carrying out said recording and reproducing process;
   a defect judgment means for judging said physical address based on said access command by using said physical address of the region in relation to said secondary defect as a reference; and
   an exchanging processing means for carrying out the process according to said access command by using a predetermined recording means different from said recording medium, for the region in relation to said secondary defect among said physical address based on said access command, in accordance with a judged result by said defect judgment means,
      wherein a primary defect is detected at a sector unit of the recording medium and registered in a primary defect list by said primary defect physical address.

2. The information processing apparatus according to claim 1, wherein
   said one exchange region is set on said recording medium,
   said exchange allocating processing means re-records data recorded in the region in relation to said secondary defect in said one exchange region, in the process for setting said one exchange region, and
   said exchanging processing means re-records the data recorded in said one exchange region in said predetermined recording means, by carrying out such a process in advance.

3. The information processing apparatus according to claim 2, wherein said process in advance is a process at a time of start-up.

4. The information processing apparatus according to claim 1, wherein
   said one exchange region is set on said predetermined recording means, and
   said exchange allocating processing means re-records data already recorded in the region in relation to said secondary defect in said one exchange region.

5. The information processing apparatus according to claim 1, wherein
   said defect judgment means carries out a process in advance to reproduce records in the process carried out by the exchange allocating processing means from said recording medium, and to obtain said physical address of the region in relation to said secondary defect.

6. The information processing apparatus according to claim 5, wherein said process in advance is a process at a time of start-up.

7. The information processing apparatus according to claim 1, wherein said defect judgment means lists and stores said physical address of the region in relation to said secondary defect.

8. The information processing apparatus according to claim 1, wherein said defect judgment means lists and stores said physical address of the region in relation to said secondary defect at a file unit.

9. The information processing apparatus according to claim 8, wherein
   said one exchange region is set on said recording medium,
   said exchange allocating processing means re-records data already recorded in the region in relation to said secondary defect in said one exchange region, in the process for setting said one exchange region, and
   said exchanging processing means carries out a process in advance to re-records the data already recorded in said one exchange region in said predetermined recording means.

10. The information processing apparatus according to claim 9, wherein said process in advance is a process before starting an access to a file specified by a read command.

11. The information processing apparatus according to claim 8, wherein
   said one exchange region is set on said predetermined recording means, and
   said exchange allocating processing means re-records data already recorded in the region in relation to said secondary defect in said one exchange region.

12. The information processing apparatus according to claim 8, wherein
   said defect judgment means carries out the process in advance, and reproduces the record in the process carried out by the exchange allocating processing means from said recording medium, and then obtains said physical address of the region in relation to said secondary defect.

13. The information processing apparatus according to claim 12, wherein said process in advance is a process before starting an access to a file specified by a read command.

14. An information processing method of converting a parameter of an access command into a physical address of an information recording surface of a recording medium, and accessing said recording medium in accordance with the physical address, the information processing method comprising the steps of:
   allocating process for detecting a region in relation to a secondary defect from said information recording surface, and setting one exchange region to be used for a recording and reproducing process so as to replace the region in relation to said secondary defect;
      wherein a secondary defect list is detected by a read-write data channel and a servo circuit in accordance with an access command for carrying out said recording and reproducing process;
   judging said physical address based on said access command, by using said physical address of the region in relation to said secondary defect as a reference; and
   carrying out the process according to said access command by using a predetermined recording means different from said recording medium, for the region in relation to said secondary defect among said physical address based on said access command, in accordance with a judged result by said defect judging step, wherein a primary defect is detected at a sector unit of the recording medium and registered in a primary defect list by said primary defect physical address.

15. The information processing method according to claim 14, wherein said one exchange region is set on said recording medium, a step of said exchange allocating process re-records data already recorded in the region in relation to said secondary defect in said one exchange region, in the process for setting said one exchange region, and a step of said exchanging process carries out a process in advance to re-record the data already recorded in said one exchange region in said predetermined recording means.

16. The information processing method according to claim 14, wherein said one exchange region is set on said predetermined recording means, and a step of said exchange allocating process re-records data already recorded in the region in relation to said secondary defect in said one exchange region.

17. A recording medium for recording an information processing method of converting a parameter of an access command into a physical address of an information recording surface of a recording medium, and accessing said recording medium in accordance with the physical address said information processing method comprising the steps of:

detecting a region in relation to a secondary defect from said information recording surface, and setting one exchange region to be used for a recording and reproducing process so as to replace the region in relation to said secondary defect;

wherein a secondary defect list is detected by a read-write data channel and a servo circuit in accordance with an access command for carrying out said recording and reproducing process;

judging said physical address based on said access command, by using said physical address of the region in relation to said secondary defect as a reference; and carrying out the process according to said access command by using a predetermined recording means different from said recording medium, for the region in relation to said secondary defect among said physical address based on said access command, in accordance with a judged result by said defect judging step, wherein a primary defect is detected at a sector unit of the recording medium and registered in a primary defect list by said primary defect physical address.

18. The recording medium for recording an information processing method according to claim 17, wherein said one exchange region is set on said recording medium, a step of said exchange allocating process re-records data already recorded in the region in relation to said secondary defect in said one exchange region, in the process for setting said one exchange region, and a step of said exchanging process carries out a process in advance to re-record the data already recorded in said one exchange region in said predetermined recording means.

19. The recording medium for recording an information processing method according to claim 17, wherein said one exchange region is set on said predetermined recording means, and a step of said exchange allocating process re-records data already recorded in the region in relation to said secondary defect in said one exchange region.

* * * * *